United States Patent [19]

Statz et al.

[11] Patent Number: 5,155,157

[45] Date of Patent: Oct. 13, 1992

[54] COMPOSITIONS USEFUL IN THE MANUFACTURE OF GOLFBALLS

[75] Inventors: Robert J. Statz, Kennett Square, Pa.; Jon P. Braemer; John F. Hagman, both of Wilmington, Del.

[73] Assignee: E. I. du Pont de Nemours and Company, Wilmington, Del.

[21] Appl. No.: 681,431

[22] Filed: Mar. 26, 1991

Related U.S. Application Data

[63] Continuation-in-part of Ser. No. 634,793, Dec. 27, 1990, abandoned.

[51] Int. Cl.⁵ .......................... C08K 3/30; C08K 3/18
[52] U.S. Cl. .................................. 524/423; 524/432; 524/513; 524/514; 524/908
[58] Field of Search ............... 524/423, 432, 114, 513, 524/514, 908

[56] References Cited

U.S. PATENT DOCUMENTS

| 3,671,477 | 6/1972 | Nesbitt | 524/424 |
|---|---|---|---|
| 4,858,924 | 8/1989 | Saito et al. | 273/218 |
| 4,919,434 | 4/1990 | Saito | 273/235 R |
| 4,955,966 | 9/1990 | Yuki et al. | 524/908 |

FOREIGN PATENT DOCUMENTS 2164342  3/1986  United Kingdom .

*Primary Examiner*—Paul R. Michl
*Assistant Examiner*—Peter Szekely
*Attorney, Agent, or Firm*—Craig H. Evans

[57] ABSTRACT

The invention provides compositions useful in the manufacture of one-, two- and three-piece golfballs comprising blends of a copolyetherester or copolyetheramide, an expoxy-containing compound, and an acid-containing ethylene copolymer ionomer.

31 Claims, No Drawings

COMPOSITIONS USEFUL IN THE MANUFACTURE OF GOLFBALLS

This application is a continuation-in-part of application Ser. No. 07/634,793 filed Dec. 27, 1990, now abandoned.

FIELD OF THE INVENTION

The subject invention relates to the manufacture of one-, two-, and three-piece golfballs, particularly with respect to polymer blend compositions useful therein.

BACKGROUND OF THE INVENTION

There currently exist two general types of premium golfballs: a "three-piece" ball which comprises a spherical molded center, having an elastomeric thread-like material wound around it, covered with either a thermoplastic or thermoset material; and a "two-piece" ball which comprises a spherical molded core covered with a thermoplastic material. The material used to mold the three-piece centers and the two-piece cores has traditionally been a thermoset rubber, for example, polybutadiene rubber. As with any thermoset material, however, there are major disadvantages, such as the inability to recycle scrap materials and the need for complex multi-step manufacturing processes. Of course, three-piece balls and two-piece balls are by their very nature more complicated and costly to manufacture than the long sought after one-piece golfball, which has yet to be successfully demonstrated except for limited flight golfballs.

In an effort to overcome the deficiencies of the traditional thermoset three-piece centers and two-piece cores, and in the quest to produce a one-piece golfball, attempts have been made to utilize certain thermoplastic materials in the molding of such centers, cores and one-piece balls, but with limited success. For example, U.K. Patent Application 2,164,342A describes moldable compositions comprising ionic copolymers (or potentially ionizable acid copolymers) blended with certain thermoplastic materials such as a polyester block copolyamide, a polyether copolyamide, a copolyester and the like. Those compositions are said to be useful as three-piece centers, two-piece cores and one-piece solid golfballs, but they lack, e.g., durability. Therefore, there still exists the need for a material that is thermoplastic, yet resilient and durable enough, and imparting adequate compression, to be useful as a three-piece center, two-piece core and a one-piece golfball.

SUMMARY OF THE INVENTION

The subject invention provides thermoplastic compositions that can be used in the manufacture of one-, two- and three-piece golfballs. More specifically, the subject invention comprises a composition for the manufacture of a one-piece golfball comprising 40-65 polymer weight percent of a thermoplastic polymer selected from copolyetheresters and copolyetheramides; 1-10 polymer weight percent of an epoxy-containing compound; 5-20 total weight percent of a filler having a density greater than or equal to about 4 gm/cc, and the remainder, to total 100 polymer weight percent, of an acid-containing ethylene copolymer ionomer.

In another embodiment, the subject invention provides a two-piece golfball in which the core comprises 50-65 weight percent of a thermoplastic polymer selected from copolyetheramides and copolyetheresters; 1-10 weight percent of an epoxy-containing compound; and the remainder, to total 100 percent, of an acid-containing ethylene copolymer ionomer; preferably provided that the thermoplastic polymer is present in greater than 50 volume percent of the composition.

In another embodiment, the subject invention provides a two-piece golfball in which the core comprises between 30 and 50 polymer weight percent of a thermoplastic polymer selected from copolyetheramides and copolyetheresters; 1-10 polymer weight percent of an epoxy-containing compound; 15-25 total weight percent of a filler having a density greater than about 5 gm/cc; and the remainder, to total 100 polymer weight percent, of an acid-containing ethylene copolymer ionomer.

In yet another embodiment, the subject invention provides a three-piece golfball in which the center comprises 65-90 weight percent of a thermoplastic polymer selected from copolyetheramides and copolyetheresters; 1-10 weight percent of an epoxy-containing compound; and the remainder, to total 100 weight percent of an acid-containing ethylene copolymer ionomer.

DETAILED DESCRIPTION OF THE INVENTION

Because the species and relative ratios of the components used in the practice of the subject invention vary somewhat depending upon the type of golfball desired (i.e., one- piece, two-piece or three-piece), it is useful to first consider the components themselves.

COMPONENT DESCRIPTION

The thermoplastic polymer component of the subject invention is selected from copolyetheresters and copolyetheramides, both classes of polymers being well known in the art. The copolyetheresters are discussed in detail in, e.g., U.S. Pat. Nos. 3,651,014; 3,766,146; and 3,763,109. They are comprised of a multiplicity of recurring long chain units and short chain units joined head-to-tail through ester linkages, the long chain units being represented by the formula

and the short chain units being represented by the formula

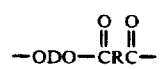

where G is a divalent radical remaining after the removal of terminal hydroxyl groups from a poly(alkylene oxide) glycol having a molecular weight of about 400-6000 and a carbon to oxygen ratio of about 2.0-4.3; R is a divalent radical remaining after removal of hydroxyl groups from a dicarboxylic acid having a molecular weight less than about 300; and D is a divalent radical remaining after removal of hydroxyl groups from a diol having a molecular weight less than about 250; provided said short chain ester units amount to about 15-95 percent by weight of said copolyetherester. The preferred copolyetherester polymers are those where the polyether segment is obtained by polymerization of tetrahydrofuran and the polyester segment is obtained by polymerization of tetramethylene glycol and phthalic acid. Of course, the more polyether units incorporated into the copolyetherester, the softer the polymer. For purposes of the subject invention, the molar ether:ester ratio can vary from 90:10 to 10:90, preferably 80:20 to 60:40; and the shore D hardness is less than 70, preferably about 40. The copolyetheramides are also well known in the art as described in, e.g., U.S. Pat. No. 4,331,786. They are comprised of a linear and regular chain of rigid polyamide segments and flexible polyether segments, as represented by the general formula

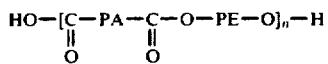

wherein PA is a linear saturated aliphatic polyamide sequence formed from a lactam or aminoacid having a hydrocarbon chain containing 4 to 14 carbon atoms or from an aliphatic $C_6$–$C_9$ diamine, in the presence of a chain-limiting aliphatic carboxylic diacid having 4–20 carbon atoms; said polyamide having an average molecular weight between 300 and 15,000; and PE is a polyoxyalkylene sequence formed from linear or branched aliphatic polyoxyalkylene glycols, mixtures thereof or copolyethers derived therefrom said polyoxyalkylene glycols having a molecular weight of less than or equal to 6000 and n indicates a sufficient number of repeating units so that said polyetheramide copolymer has an intrinsic viscosity of from about 0.8 to about 2.05. The preparation of these polyetheramides comprises the step of reacting a dicarboxylic polyamide, the COOH groups of which are located at the chain ends, with a polyoxyalkylene glycol hydroxylated at the chain ends, in the presence of a catalyst such as a tetraalkylorthotitanate having the general formula $Ti(OR)_4$, wherein R is a linear branched aliphatic hydrocarbon radical having 1 to 24 carbon atoms. Again, the more polyether units incorporated into the copolyetheramide, the softer the polymer. The ether:amide ratios are as described above for the ether:ester ratios, as is the shore D hardness.

The epoxy-containing compound component of the subject invention can be any compound that has an epoxy functionality readily available for reaction with the carboxylic acid groups in the ethylene copolymer ionomers detailed below. Such compounds include, for example, epoxidized oils such as epoxidized soy bean oil, epoxidized elastomers such as epoxidized natural rubber or epoxidized polybutadiene rubber, or an epoxy-containing copolymer E/X/Y wherein E is ethylene, X is a softening comonomer, for example, an acrylate, methacrylate, vinyl ether or vinyl ester comonomer present in 0–50 (preferably 0–35, most preferably 0–30) weight percent of the polymer, and Z is an epoxy-containing vinyl unsaturated monomer present in 1–25 (preferably 1–20, most preferably 1–15) weight percent of the polymer; such copolymers include without limitation, ethylene copolymers copolymerized with one or more reactive monomers selected from unsaturated epoxides of 4–11 carbon atoms, such as glycidyl acrylate, glycidyl methacrylate, and vinyl glycidyl ether, and optionally additionally containing alkyl acrylate, alkyl methacrylate, carbon monoxide, sulfur dioxide and/or alkyl vinyl ether, where the alkyl radical is from 1–12 carbon atoms. Preferred glycidyl containing copolymers for use in the compositions of the present invention include ethylene/glycidyl acrylate, ethylene/n-butyl acrylate/glycidyl acrylate, ethylene/methyl acrylate/glycidyl acrylate, ethylene/glycidyl methacrylate, ethylene/n-butyl acrylate/glycidyl methacrylate and ethylene/methyl acrylate/glycidyl methacrylate copolymers. The most preferred glycidyl-containing copolymers are ethylene/n-butyl acrylate/ glycidyl methacrylate and ethylene/glycidyl methacrylate copolymers.

These glycidyl-containing ethylene copolymers are made by processes well known in the art, e.g., by direct copolymerization of ethylene, glycidyl methacrylate or glycidyl acrylate, and the above-defined acrylate or methacrylate in the presence of a free-radical polymerization initiator at elevated temperatures, preferably 100°–270° C. and most preferably 130°–230° C., and at elevated pressures, preferably at least 70 MPa, and most preferably 140–350 MPa.

The acid-containing ethylene copolymer ionomer component of the subject invention includes E/X/Y copolymers where E is ethylene, X is a softening comonomer such as acrylate or methacrylate present in 0–50 (preferably 0–25, most preferably 0–2) weight percent of the polymer, and Y is acrylic or methacrylic acid present in 5–35 (preferably 10–35, most preferably 15–35) weight percent of the polymer, wherein the acid moiety is neutralized 1–90% (preferably at least 40%, most preferably at least about 60%) to form an ionomer by a cation such as lithium*, sodium*, potassium, magnesium*, calcium, barium, lead, tin, zinc* or aluminum (* = preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers. The manner in which the ionomers are made is well known in the art as described in, e.g., U.S. Pat. No. 3,262,272 (Rees).

The optional filler component of the subject invention is chosen to impart additional density to blends of the previously described components, the selection being dependent upon the type of golfball desired (i.e., one-piece, two-piece or three-piece), as will be more fully detailed below. Generally, the filler will be inorganic having a density greater than about 4 gm/cc, preferably greater than 5 gm/cc, and will be present in amounts between 5 and 65 weight percent based on the total weight of the polymer components. Examples of useful fillers include zinc oxide, barium sulfate, lead silicate and tungsten carbide, as well as the other well known corresponding salts and oxides thereof. It is preferred that the filler materials be non-reactive with the polymer components described above. Additional optional additives useful in the practice of the subject invention include acid copolymer waxes (e.g., Allied wax AC143 believed to be an ethylene/16-18% acrylic acid copolymer with a number average molecular weight of 2,040) which assist in preventing reaction between the filler materials (e.g., ZnO) and the acid moiety in the ethylene copolymer; $TiO_2$ which is used as a whitening agent; optical brighteners; surfactants; processing aids; etc.

The specific combinations of components used in the practice of the subject invention will in large part be dependent upon the type of golfball desired (i.e. one-piece, two-piece or three-piece), as detailed below.

In general, the molding techniques used in the manufacture of one-piece, two-piece, and three-piece balls are well known. It is preferable to use runnerless molding techniques, most preferably valve gated, where the polymer is injection molded into the cavity. This technology greatly improves efficiency and cost as runners are eliminated, as is all of the effort and cost relative to rework. In the case of one-piece balls, the valve gate(s) can be disguised as a dimple in the ball eliminating the need for secondary finishing of the gate vistige. Also most preferably, the use of the traditional stack molding techniques can significantly reduce costs and improve efficiency.

THREE-PIECE GOLFBALL PREFERRED EMBODIMENTS

As used herein, the term "three-piece ball" refers to a golfball comprising a center made from the compositions of the invention, a traditional elastomeric winding wound around the center, and a cover made from any traditional golfball cover material such as Surlyn® ionomer resin, balata rubber and the like. These three-piece golfballs are manufactured by well known techniques as described in, e.g., U.S. Pat. No. 4,846,910.

For purposes of the subject invention, the center is made by injection molding of the compositions of this invention. Those centers are then placed into a winding machine in which the end of an elastomeric thread is affixed to the molded center and the thread wound around the center to a predetermined thickness. A dimple-patterned cover is then molded around this wound center. For use as the center material for three-piece balls, the preferred composition of the subject invention comprises 65-90 weight percent of the thermoplastic component, 1-10 weight percent of the epoxy-containing compound and the remainder, to total 100 weight %, of the acid-containing ethylene copolymer ionomer. The most preferred compositions of the invention for use as a three-piece center also contain about 40-60 weight percent of the previously described filler material, based on total weight of the three polymer components plus filler. The most preferred thermoplastic component for use in the three-piece ball is a copolyetherester; the most preferred epoxy-containing compound is a glycidyl-containing ethylene copolymer; and the most preferred acid-containing ethylene copolymer ionomer is an ethylene/methacrylic acid or ethylene/acrylic acid copolymer. The three-piece ball that performs most satisfactorily, as seen in the Examples below, contains a center molded from a composition that comprises from about 35 weight percent (total composition) of the polyetherester, described in Table 1 below as "H1", 1-5 weight percent of an ethylene/n-butylacrylate (28%)/glycidyl methacrylate (8%) copolymer, about 10 weight percent of an ethylene/methacrylic acid (20%) copolymer highly neutralized with Na cations to form the ionomer, about 50 weight percent ZnO, and about 5 weight percent Allied wax AC143. Note that these weight percentages are given as a percent based on total composition to more clearly show the relative proportion of components in an actual three-piece center formulation.

TWO-PIECE GOLFBALL PREFERRED EMBODIMENTS

As used herein, the term "two-piece ball" refers to a golfball comprising a core made from the compositions of the invention, and a cover made from any traditional golfball cover material as discussed above. These two-piece balls are manufactured by first molding the core from the compositions of the subject invention, positioning these preformed cores in an injection molding cavity using retractable pins, then injection molding the cover material around the core. The most efficient way to produce two-piece golf balls is to use runnerless molding techniques, preferably valve gated, where the polymer is injection molded into the cavity at the pole or poles instead of the equator as is commonly done. The valve gate is disguised as a dimple in the ball. This technology greatly improves the efficiency and cost of producing two-piece golf balls as the runners are eliminated, as is all of the effort and cost relative to rework. For use as the core material for two-piece balls, one preferred composition of the subject invention comprises 50 to 65 polymer weight percent of the thermoplastic component, 1-10 polymer weight percent of the epoxy-containing compound, and the remainder to total 100 weight percent, of the acid-containing ethylene copolymer ionomer; preferably provided that the thermoplastic component is present in greater than 50 volume percent of the composition. It is also preferred that such compositions contain 15-25 total weight percent of the previously described filler material. In another preferred composition, the thermoplastic component is present between 30 and 50 polymer weight percent, the epoxy-containing component present between 1 and 10 polymer weight percent, and the ionomer the remainder to total 100 weight percent, but in such a composition the filler material is necessarily present in 15-25 weight percent based on total composition, and must have a density of greater than about 5 gm/cc (e.g., zinc oxide, lead silicate or tungsten carbide). In both embodiments, the most preferred thermoplastic component is a copolyetherester; the most preferred epoxy-containing compound is a glycidyl-containing ethylene copolymer; and the most preferred acid-containing ethylene copolymer ionomer is an ethylene/(meth)acrylic acid copolymer. The two-piece ball that performs most satisfactorily, as seen in the Examples below, contains a core molded from a composition that comprises 50-60 polymer weight percent of the polyetherester described in Table 1, 1-5 polymer weight weight percent of an ethylene/n-butyl acrylate (28%)/glycidyl methacrylate (5%) copolymer, 40-45 polymer weight percent of an ethylene/(meth)acrylic acid (20%) copolymer highly neutralized with Na cations to form the ionomer, about 20 total weight percent ZnO, and about 5 weight percent Allied wax.

ONE-PIECE GOLFBALL PREFERRED EMBODIMENTS

As used herein, the term "one-piece ball" refers to a golfball molded in toto from the compositions of the subject invention, i.e., not having elastomeric windings nor a cover. The one-piece molded ball will have a traditional dimple pattern and may be coated with a urethane lacquer or be painted for appearance purposes. These one-piece balls are manufactured by direct injection molding techniques under conditions described below in Table 2B. For use in one-piece balls, the preferred composition of the subject invention comprises 40 to 65 polymer weight percent of the thermoplastic component, 1–10 polymer weight percent of the epoxy-containing compound, 5–20 weight percent, based on the total weight percent, of the previously described filler material and the remainder, to total 100 polymer weight percent, of the acid-containing ethylene copolymer ionomer. Again, the most preferred thermoplastic component is a copolyetherester; the most preferred epoxy-containing compound is a glycidyl-containing ethylene copolymer; and the most preferred acid-containing ethylene copolymer ionomer is an ethylene/methacrylic acid copolymer. The one-piece ball that performs the most satisfactorily, as seen in the Examples below, is molded from a composition of the subject invention comprising about 55 polymer weight percent of the polyetherester described in Table 1, 1–5 polymer weight percent of ethylene/n-butyl acrylate (28%)/glycidyl methacrylate (8%) copolymer, 40–45 polymer weight percent of an ethylene/methacrylic acid (20%) copolymer highly neutralized with Na cations to form the ionomer, about 10 total weight percent ZnO, about 5 total weight percent AC143 Allied wax, and about 5 total weight percent $TiO_2$.

Those skilled in the art will appreciate that certain variations of the compositions of the subject invention will also be useful in the manufacture of one-piece and two-piece restricted flight golfballs, also commonly known as range balls; the distance that such range balls can travel being dependent upon the resiliency of the materials used and the compression imparted. Further, the compositions of the subject invention having flex modulus of about 14,000–30,000 (ASTM D790, procedure B), preferably without filler, may also be employed as golfball cover materials.

TESTING CRITERIA

In the Examples set out below, a number of testing criteria are utilized in the evaluation of golfball performance: percent rebound, total distance travelled, initial velocity, coefficient of restitution (COR) and compression. Percent rebound is determined by dropping the ball (or three-piece center/two-piece core) from a height of 100 inches and measuring the rebound from a hard, rigid surface such as a thick steel plate or a stone block; an acceptable result is about 65–80%. Total distance is determined by striking a ball with a 10.5 degree loft driver at a clubhead speed of 95 mph; an acceptable result is about 220–250 yds. Initial velocity is the measured speed of the ball off a clubhead as described for total distance (acceptable result approaching but less than 215 ft/sec as used in Table 2A) or the measured speed of the ball when hit at 230 feet per second by an implement having a face angle of 13° with respect to the vertical (acceptable result approaching but less than 255 ft/sec as used in Table 1C). COR is measured by firing a golfball (or two piece core) from an air cannon at a velocity determined by the air pressure. The initial velocity generally employed is between 125 to 255 feet/second. The ball strikes a steel plate positioned three feet away from the point where initial velocity is determined, and rebounds through a speed-monitoring device. The return velocity divided by the initial velocity is the COR; acceptable results are 0.550–0.750 at 180 ft/sec or 0.500–0.650 at 230 ft/sec. Compression is defined as the resistance to deformation of a golfball, measured using an ATTI machine; an acceptable result is about 70–120.

EXAMPLES 1, 2, 3; COMPARATIVE EXAMPLES C1, AND C2; AND CONTROL EXAMPLE.

These examples and comparative examples illustrate the preparation and properties of centers for three-piece golf balls and of finished balls from such centers. Blends for the thermoplastic centers of such balls were prepared by extrusion in a twin screw extruder. The compositions are given in Table 1, and extrusion conditions shown in Table 1A. These blends were then molded into spheres of 1.08 in. diameter using an 8 oz. Van Dorn Injection molding machine, with molding conditions shown in Table 1B. Density and percent rebound were measured on these centers. The centers were also made into three piece balls using conditions similar to those described in U.S. Pat. No. 4,846,910 to Acushnet Corp., by winding with natural rubber threads, and compression molding a cover on top of the windings using a Surlyn ® ionomer blend. As a control, the properties of an Acushnet 'Titleist DT' ball are shown. This ball is made of a crosslinked (non thermoplastic) polybutadiene center, natural rubber windings and the same ionomer cover used for the thermoplastic center balls. All property measurements are shown in Table 1C.

TABLE I

CENTER COMPOSITIONS

| Ex # | Ref# | Hytrel(H1) | EBAGMA(G1) | Ionomer | Filler | Additive |
|---|---|---|---|---|---|---|
| 1 | 62-4 | 35(78) | 3(4) | I1. 8(18) | F1. 51 | A1 |
| 2 | 62-1 | 36(75) | 2(4) | I1. 10(21) | F1. 48 | A1 |
| 3 | 41-5 | 41(73) | 1(2) | I2. 14(25) | F1. 40 | A1 |
| 4 | 10-3 | 44(73) | 1(2) | I2. 15(25) | F2. 40 | — |
| 5 | 10-2 | 51(73) | 1(2) | I2. 18(25) | F2. 30 | — |

(Values are weight percentages. Percentages given in parentheses are on a polymer only basis.)
H1 is a 'Hytrel'. resin with composition 18.2/0.3/72.3/9.1:terphthaloyl/TMTM/PTMEG2000/1,4 butane diol, plus an antioxidant. PTMEG is polytetramethylene glycol. TMTM is trimethyltrimellitoyl.
(G1)Ethylene/28% butyl acrylate/8.4% glycidyl methacrylate with a melt index of 10.6.
(I1)Ethylene/20% methacrylic acid, 57% Na neutral., MI = 1
(I2)Ethylene/15% methacrylic acid, 52% Li neutral., MI = 1.8
(F1)Fisher Zinc Oxide
(F2)Wittaker Clark Barium Sulfate. Blanc Fix N
(A1)AC143 Ethylene/15.66% acrylic acid with Mn = 2040, Mw = 5670

TABLE 1A

EXTRUSION CONDITIONS FOR BALL COMPOSITIONS

| Screw Speed RPM | Zone 1 Temp° C. | Zone 2 Temp° C. | Zone 3 Temp° C. | Die Temp° C. | Rate lbs/hr | Vacuum In |
|---|---|---|---|---|---|---|
| 150 | 161 | 194 | 202 | 207 | 16.4 | 26 |

TABLE 1B

MOLDING CONDITIONS FOR THREE PIECE CENTERS*

Temperatures Degrees C

Rear 174

TABLE 1B-continued

| MOLDING CONDITIONS FOR THREE PIECE CENTERS* | |
|---|---|
| Center | 177 |
| Front | 177 |
| Nozzle | 171 |
| Mold | |
| Fixed | 10 |
| Movable | 10 |
| Pressures Kg/sq. cm. | |
| Injection 1st stage | 140 |
| Injection Second Stage | 84 |
| Injection Hold | 14 |
| Cycle Times Sec: | |
| Injection | 10 |
| Hold | 300 |
| Booster | 7 |
| Screw Retraction | 1.75 |
| Pad (cm) | .05 |
| Screw Speed (RPM) | 55 |
| Back Pressure (kg/sq. cm) | 8.4 |
| Mold Size 1.092 Inches Diameter (0.429 cm) | |
| Part Size 1.08 Inches Diameter (0.425 cm) | |

*Prototype mold, limited cooling, two cavity

TABLE 1C

PROPERTIES OF THREE PIECE CENTERS OR BALLS

| | Center | | | Ball | | | |
|---|---|---|---|---|---|---|---|
| Ex# | MI (1) | Density (g/cc) | % Rebound | Compr. ATTI | Wt. (g) | Velocity ft/sec | % Rej. (2) |
| 1 | 11.1 | 1.71 | 67 | 85.9 | 45.2 | 250.9 | 0 |
| 2 | 17.6 | 1.56 | 69.6 | 85.9 | 43.8 | 251.8 | 7.1 |
| 3 | 20.0 | 1.45 | 67.4 | 97.2 | 42.2 | 252.0 | 17 |
| C1 | 17.0 | 1.48 | 69.4 | 94.7 | 42.6 | 251.4 | 68 |
| C2 | 22.0 | 1.31 | 70.5 | 98.0 | 41.0 | 253.0 | 62 |
| Control | | | 70.0 | 77.3 | 45.2 | 252.8 | 22.7 |

(1)Measured using ASTM D1238, with 10 Kg. wt at 220 deg. C
(2)Percent Reject based on out of roundness as measured by a fluoroscope on finished ball. Out of roundness is caused by the combined effect of pressure due to winding and the heat associated with the compression molding of the cover. Out of round balls behave unsatisfactorily, and would have properties outside USGA standards The first three examples show that balls may be made satisfactorily with respect to number of rejects, and these are actually less than in the case of the thermoset center ball control. Compression is somewhat higher than for the control, but within the acceptable range of about 70 to 120. Initial velocity is below the acceptable maximum of 255. The % rebound is comparable to the control center, and an indication of generally acceptable performance. It will be noted however, that the best balls are produced when the EBAGMA level is highest. In the two comparative examples, while measured properties were acceptable, the level of rejects was totally unacceptable. Comparative example C1 has a low level of polyetherester and filler. Comparative example C2 has a very low level of filler.

EXAMPLES 4, 5, AND 6; COMPARATIVE EXAMPLE C3 AND CONTROL EXAMPLE

These examples describe the preparation of blends for the core for two piece golf balls, golf balls made therefrom, and the properties of the cores and finished balls. The composition of these blends is shown in Table 2. The blends were made using extrusion conditions the same as those for three piece center compositions shown in Table 1A. The blends were molded into cores using conditions shown in Table 2B. The core is 1.5 inches in diameter. Balls were prepared by positioning preformed thermoplastic cores in an injection molding cavity. The cores were centrally positioned in the cavity by the use of retractable pins. A cover of mixed 'Surlyn' ionomer resin was then injection molded around the core. Properties of the resultant cores or balls are shown in Table 2A.

TABLE 2

CORE COMPOSITIONS

| Ex # | Ref# | Hytrel(H1) | EBAGMA | Ionomer | Filler | Additive |
|---|---|---|---|---|---|---|
| 4 | 72-1 | 41(53) | G2. 3(4) | I1. 33(43) | F3. 19 | A1. 4 |
| 5 | 8143-3 | 42(52) | G2. 3(4) | I2. 35(44) | F4. 20 | — |
| 6 | 115-3 | 42(55) | G1. 1(2) | I1. 33(43) | F3. 19 | A1. 4 |
| C3 | 104-2 | 21(27) | G3. 7(9) | I3. 49(64) | F2. 22 | — |
| C4 | 016R | 43(56) | 0 | I1. 34(44) | F3. 19 | A1. 4 |

Values are weight percentages. Percentages given in parenthesis are on a polymer only basis
H1. G1. I1. I2. A1. F2 as in Table 1.
G2 Ethylene/28% n-butyl acrylate/5.3% glycidyl methacrylate with a melt index of 12.0
G3 Ethylene/34.5% n-butyl acrylate/5.3% glycidyl methacrylate with a melt index of 6.0
I3 Ethylene/15% methacrylic acid. 57% Na neutralized. MI = 1.2
F3 Zinc Oide. grade XX503R. Zinc Corp. of America.
F4 Barium Sulfate. 'Barmite' 4.3 microns. Cyprus Corp.

TABLE 2A

PROPERTIES OF TWO PIECE CORES OR BALLS

| | Core | | | Ball | | | | |
|---|---|---|---|---|---|---|---|---|
| Ex# | Compr. ATTI | Durabil. Hits/Break at psi | COR | Compr. ATTI | Reb. % | Velocity | COR | Carry & Roll (yds) |
| 4 | | 17/50, 20/40 | .638 | 121 | 77 | 209.8 | .614 | 236 |
| 5 | | | | 118 | 74 | 208.0 | .582 | 229 |
| 6 | | | | 111 | 74 | 208.4 | .586 | 235 |
| C3 | 122 | | | 133 | 67.8 | — | — | — |
| C4 | | 4/50, 7/40 | .635 | | | | | |
| CONTROL | | | | 111 | 81 | 213.5 | .641 | 249 |

The Control ball is a Ram LP ball which has a thermoset butadiene core and a mixed ionomer cover. Coefficient of restitution for cores was measured at 180 ft/sec. Coefficient of restitution for balls was measured using an air canon with a pressure of 45 psi. which gives a velocity of about 230 ft./sec. Values for balls can be compared from one to another, but not with the COR values for cores or the one piece balls shown below, which are measured using different conditions. The test is used for general guidance to ball performance.

Examples 4 and 5 indicate that zinc oxide and a high acid ionomer give slightly superior resilience than barium sulfate and ionomer containing lower acid levels. Properties of all the thermoplastic cores are acceptable, though not quite equal to that of the control thermoset core ball. Comparative Example C3 has a low Hytrel and a high ionomer level; as a result, the compression is very high. High compression values indicate a high force to compress, and a ball with a 'hard' feel. Example C4 used a blend with no epoxy-containing polymer. The blend was compared with example 4 for coefficient of restitution and durability. Durability was determined by firing from an air canon at the indicated pressure against a steel rebound plate, and counting the number of hits before the ball breaks. While it had a comparable coefficient of restitution, its durability was extremely poor, indicating a strong need to compatibilize the blend with the epoxy containing polymer.

TABLE 2B

MOLDING CONDITIONS FOR TWO PIECE CORES AND ONE PIECE BALLS*

| Temperatures Degrees C | |
|---|---|
| Rear | 183 |
| Center | 173 |
| Front | 173 |
| Nozzle | 177 |
| Mold Front/Back | 10 |
| Melt | 195 |
| Pressures Kg/Square Cm | |
| Injection 1st Stage | 130 |
| Injection 2nd Stage | 110 |
| Injection Hold | 13 |
| Cycle Times (sec) | |
| Pac | 10 |
| Hold | 480 |
| Booster | 10 |
| Cure Time | 15 |
| Screw Retraction | 5.35 |
| Pad (cm) | 0.6 |
| Screw Speed RPM | 55 |
| Back Pressure (Kg/square cm) | |
| Mold Diameter (cm) | 3.88 |

*Prototype mold, limited cooling, four cavity

EXAMPLES 7, 8, 9 AND 10 AND CONTROL EXAMPLE

These examples illustrate the use of the thermoplastic blends of the invention for use in one piece balls. The blends were made using extrusion conditions as in Table 1A. Balls were molded using conditions as in Table 2B, except that the ball diameter was 1.65 inches. Compositions are given in Table 3, and properties are shown in Table 3B.

TABLE 3

ONE PIECE BALL COMPOSITIONS

| Ex # | Ref# | Hytrel | EBAGMA | Ionomer | Filler | Additive |
|---|---|---|---|---|---|---|
| 7 | 136-1 | H1, 42(51) | G1, 3(4) | I3, 37(45) | F2, 17 | T, 1 |
| 8 | 150-1 | H2, 44(52) | G1, 3(4) | I3, 37(44) | F2, 15 | T, 1 |
| 9 | 8143-3 | H1, 42(52) | G1, 3(4) | I2, 35(44) | F4, 20 | — |
| 10 | H003A | H1, 46(56) | G2, 3(4) | I1, 34(41) | F3, 9.5 | T, 4 Al, 4 |

Values are weight percentages. Percentages in parenthesis are on a polymer only basis.
H1, G1, G2, I1, I2, I3, F2, F3, F4, A1 as in previous tables.
H2 is a 'Hytrel' resin with composition: 27.4/7.9/44.8/19.5% ter/isophthaloyl/PT-MEG2000/1.4butane diol, plus an antioxidant.
T is TiO2, grade R960 mfg. by the DuPont Company.

TABLE 3B

PROPERTIES OF ONE PIECE BALLS

| Ex # | Melt Flow (g/cc) | Dens. | % Rebound | Compr. | COR | Durability (Hits) |
|---|---|---|---|---|---|---|
| 7 | 3.0 | 1.16 | 64 | 83 | .586 | >200 |
| 8 | 5.3 | 1.17 | — | — | .558 | — |
| 9 | 13.6 | 1.20 | 67 | 104 | .602 | >200 |
| 10 | — | 1.12 | — | 88 | .653 | — |

TABLE 3B-continued

PROPERTIES OF ONE PIECE BALLS

| Ex # | Melt Flow (g/cc) | Dens. | % Rebound | Compr. | COR | Durability (Hits) |
|---|---|---|---|---|---|---|
| Control | 1.14 | — | 100 | .737 | 100 | |

The control was a Wilson ULTRA two piece ball, with a thermoset butadiene core and a 'Surlyn' blend cover.

Coefficient of Restitution was measured using an air cannon with initial ball velocity of 180 ft./sec. The results suggest that "soft" polyetherester appears to give superior results to a harder grade (example 8), and a harder ionomer (more methacrylic acid as in example 10) is also preferred.

What is claimed is:

1. A three-piece golfball comprised of a center, an elastomeric winding and a cover wherein the center comprises a thermoplastic composition comprising:
    a) 65-90 weight percent of a thermoplastic polymer selected from copolyetheramides and copolyetheresters;
    b) 1-10 weight percent of an epoxy-containing compound having sufficient epoxy functionality readily available for reaction with the ionomer of c) but insufficient epoxy functionality to produce a thermoset composition; and
    c) the remainder, to total 100 weight percent of an acid-containing ethylene copolymer ionomer.

2. The golfball of claim 1 wherein the thermoplastic composition further contains about 40-60 weight percent, based on the total weight of the composition of a filler having a density greater than or equal to about 4 gm/cc.

3. The golfball of claim 2 where the filler is selected from ZnO and BaSO4.

4. The golfball of claim 1, 2 or 3 where a) is a copolyetherester.

5. The golfball of claim 1, 2 or 3 where b) is a glycidyl-containing copolymer.

6. The golfball of claim 1, 2 or 3 where c) is an ethylene/(meth)acrylic acid copolymer.

7. The golfball of claim 1, 2 or 3 where a) is a copolyetherester, b) is a glycidyl-containing copolymer, and c) is an ethylene/(meth)acrylic acid copolymer.

8. A three-piece golfball comprised of a center, an elastomeric winding and a cover wherein the center comprises a composition selected from those of claim 1, 2 or 3.

9. A three-piece golfball comprising a center, an elastomeric winding and a cover wherein the center comprises about 35 weight percent (total) of a polyetherester having a shore D hardness of 40, 1-5 weight percent of an ethylene/n-butylacrylate (28%)/glycidyl methacrylate (5%) copolymer, about 10 weight percent of an ethylene/methacrylic acid (20%) copolymer highly neutralized with Na cation, and about 50 weight percent ZnO.

10. A two-piece golfball comprised of a core and a cover wherein the core comprises a thermoplastic composition comprising:
    a) 50-65 weight percent of a thermoplastic polymer selected from copolyetheramides and copolyetheresters;
    b) 1-10 weight percent of an epoxy-containing compound having sufficient epoxy functionality readily available for reaction with the ionomer of c) but insufficient epoxy functionality to produce a thermoset composition; and c) the remainder, to total 100 weight percent, of an acid-containing ethylene copolymer ionomer.

11. The golfball of claim 10 wherein the thermoplastic composition further contains about 15–25 weight percent, based on the total weight of the composition, of a filler having a density greater than or equal to about 4 gm/cc.

12. The golfball of claim 11 where the filler is selected from ZnO and BaSO$_4$.

13. The golfball of claim 10, 11 or 12 where a) is a copolyetherester.

14. The golfball of claim 10, 11 or 12 where b) is a glycidyl-containing copolymer.

15. The golfball of claim 10, 11 or 12 where c) is an ethylene/(meth)acrylic acid copolymer.

16. The golfball of claim 10, 11 or 12 where a) is a copolyetherester, b) is a glycidyl-containing copolymer, and c) is an ethylene/(meth)acrylic acid copolymer.

17. A two-piece golfball comprising a core and a cover, wherein the core comprises 50–65 polymer weight percent of a thermoplastic polymer selected from polyetheramides and polyetheresters, 1–10 polymer weight percent of an epoxy-containing compound, 15–25 total weight percent ZnO and the remainder to total 100 polymer percent, of an acid-containing ethylene copolymer ionomer, the epoxy-containing compound having sufficient epoxy functionality readily available for reaction with the ionomer but insufficient epoxy functionality to produce a thermoset composition.

18. A two-piece golfball comprising a core and a cover wherein the core comprises 50–65 polymer weight percent of a polyetherester having a shore D hardness of about 40, 1–5 polymer weight percent of an ethylene/n-butyl acrylate (28%)/glycidyl methacrylate (5%) copolymer; 40–45 polymer weight percent of an ethylene/(meth)acrylic acid (20%) copolymer highly neutralized with Na cations, and about 20 total weight percent ZnO.

19. A two-piece golfball comprised of a core and a cover, wherein the core comprises a thermoplastic composition comprising:
a) between 30 and 50 polymer weight percent of a thermoplastic polymer selected from copolyetheramides and copolyetheresters;
b) 1–10 polymer weight percent of an epoxy-containing compound having sufficient epoxy functionality readily available for reaction with the ionomer of d) but insufficient epoxy functionality to produce a thermoset composition;
c) 15–25 total weight percent of a filler having a density greater than about 5 gm/cc; and
d) the remainder, to total 100%, polymer percent of an acid-containing ethylene copolymer ionomer.

20. The golfball of claim 19 where a) is a copolyetherester.

21. The golfball of claim 19 where b) is a glycidyl-containing copolymer.

22. The golfball of claim 19 where d) is an ethylene/(meth)acrylic acid copolymer.

23. The golfball of claim 19 where a) is a copolyetherester, b) is a glycidyl-containing copolymer, and d) is an ethylene/(meth)acrylic acid copolymer.

24. The golfball of claim 19, 20, 21, 22, or 23 where the filler is selected from ZnO, lead silicate and tungsten carbide.

25. A one-piece golfball comprising a thermoplastic composition comprising:
a) 40–65 polymer weight percent of a thermoplastic polymer selected from copolyetheresters and copolyetheramides;
b) 1–10 polymer weight percent of an epoxy-containing compound having sufficient epoxy functionality readily available for reaction with the ionomer of d) but insufficient epoxy functionality to produce a thermoset composition;
c) 5–20 total weight percent of a filler having a density greater than 4 gm/cc; and
d) the remainder, to total 100 polymer weight percent, of an acid-containing ethylene copolymer ionomer.

26. The golfball of claim 25 where a) is a copolyetherester.

27. The golfball of claim 25 where b) is a glycidyl-containing copolymer.

28. The golfball of claim 25 where c) is an ethylene/(meth)acrylic acid copolymer.

29. The golfball of claim 25 where a) is a copolyetherester, b) is a glycidyl-containing copolymer, and d) is an ethylene/(meth)acrylic acid copolymer.

30. The golfball of claim 25, 26, 27, 28, or 29 where the filler is selected from ZnO and BaSO$_4$.

31. A one-piece golfball comprising about 55 polymer weight percent of a polyester having a shore D hardness of about 40, 1–5 polymer weight percent of ethylene/n-butyl acrylate (28%/glycidyl methacrylate (5%) copolymer, 40–45 polymer weight percent of an ethylene/methacrylic acid (20%) copolymer highly neutralized with Na cations, and about 10 total weight percent ZnO.

* * * * *